G. E. EWERS.
AUXILIARY AIR INTAKE.
APPLICATION FILED MAY 24, 1919.

1,322,415.

Patented Nov. 18, 1919.

Inventor
George E. Ewers,

By G. Hume Talbert
Attorney

UNITED STATES PATENT OFFICE.

GEORGE E. EWERS, OF DETROIT, MICHIGAN.

AUXILIARY AIR-INTAKE.

1,322,415.  Specification of Letters Patent.  Patented Nov. 18, 1919.

Application filed May 24, 1919. Serial No. 299,490.

*To all whom it may concern:*

Be it known that GEORGE E. EWERS, a citizen of the United States of America, residing at Detroit, in the county of Wayne and State of Michigan, has invented new and useful Improvements in Auxiliary Air-Intakes, of which the following is a specification.

The object of the invention is to provide an auxiliary air intake apparatus for use in connection with the intake manifold of a gasolene or similar engine for the purpose of insuring a more perfect and satisfactory mixture of gas and air with an attendant economy of fuel under varying conditions of load, without necessitating any substantial departure from the fuel feed means now in common use in connection with engines employed for automobiles and similar vehicles.

With this and related objects in view the invention consists in a construction and combination of parts hereinafter fully described, it being understood that changes in form, proportion and specific relation may be resorted to within the scope of the claims without departing from the principles involved.

Figure 1:
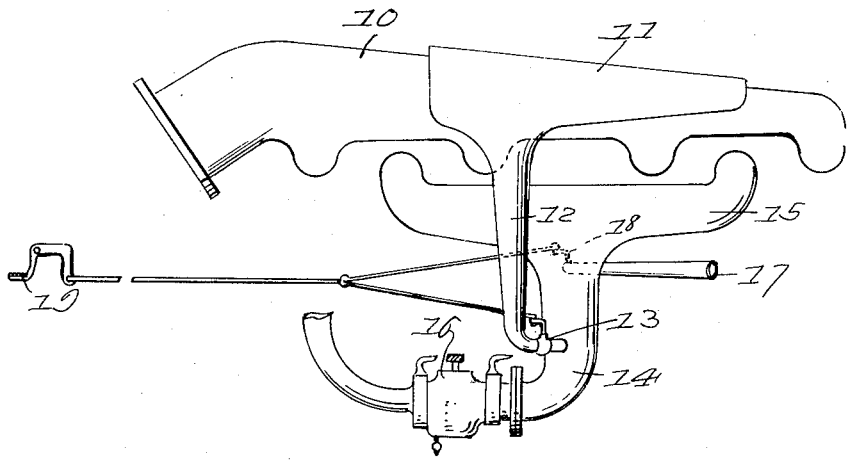
Figure 1 is a side view of an apparatus embodying the invention.
Figure 2:
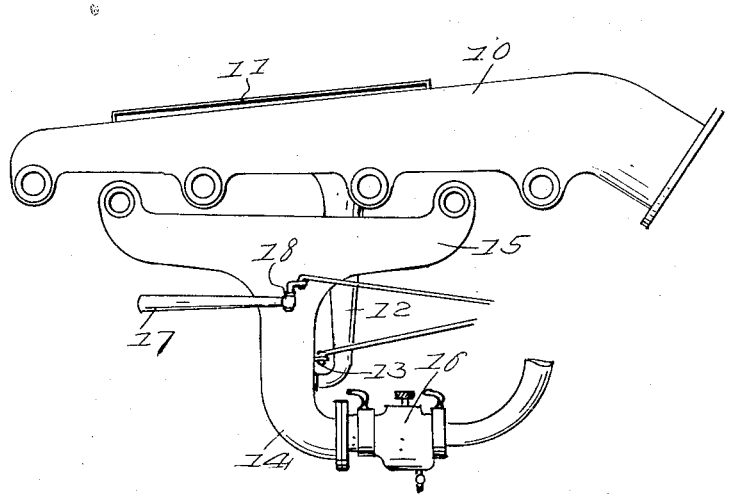
Fig. 2 is a similar view of the opposite side of the apparatus from that indicated in Fig. 1.

Disposed to extend over and preferably supported by the exhaust manifold 10 of a gasolene engine of any one of the ordinary types is a hood 11 forming a hot air inlet element by reason of being spaced from the wall of the exhaust manifold to form a chamber in which the air inducted through the feed pipe 12 which is in communication therewith is heated by radiation from said exhaust manifold. The feed pipe is provided with a cutoff valve 13 to control the amount of heated air which is fed from said hood to the mixer 14 of the intake manifold 15, also of the ordinary or any preferred construction.

The point of intersection or communication of the hot air feed pipe 12 with the mixer or feed element of the intake manifold is between the latter and the carbureter 16, so that the hot air is brought into contact with the fuel after it has left the carbureter and serves to modify the mixture without affecting in any way the operation of the carbureter.

Also in communication with the mixer or feed chamber of the intake manifold is a cold air inlet pipe 17 having a controlling valve or cutoff 18 which in common with the hot air feed valve 13 is connected with a foot lever or treadle 19 or an equivalent means whereby the operator may control the extent of opening of said valves and hence the feed of hot and cold air to the intake manifold. The point of intersection or communication of the cold air feed pipe with the intake manifold is subsequent or successive to the point of communication of the hot air feed pipe therewith, so that the fuel as it leaves the carbureter is first brought into contact with the hot air to insure a complete vaporization of the elements of the fuel, after which the mixture is completed by the introduction of the amount of cold air determined by the extent of opening of the feed valve 18, to the end that a more complete and satisfactory mixture is furnished by the intake manifold to the engine, and obviously with the result that a more economical use of the fuel is attained.

Claimed:—

1. In a gas engine the combination with an intake manifold and a carbureter for supplying fuel thereto, of hot and cold air inlet conductors in successive communication with the manifold between the carbureter and the point of communication with the engine cylinders.

2. In a gas engine the combination with the exhaust and intake manifolds thereof, of a hood forming a hot air feed element disposed in operative relation with the exhaust manifold, a hot air feed pipe extending from said hood to and in communication with the intake manifold, a cold air feed pipe also in communication with said intake manifold, and means for controlling the extent of communication of said feed pipes with the manifold.

3. In a gas engine the combination with exhaust and intake manifolds and a carbureter for supplying the latter, of hot and cold air feed pipes in communication with the intake manifold at points respectively adjacent to and remote from the carbureter and between the latter and the point of communication of the intake manifold with the engine cylinders, and means for controlling the said feed pipes.

4. In a gas engine the combination with the exhaust and intake manifolds thereof, and a carbureter in communication with the latter, of hot and cold air feed pipes in communication with the intake manifold at points respectively adjacent to and remote from the carbureter and between the latter and the point of communication of the intake manifold with the engine cylinders, a hot air inlet hood operatively related with the exhaust manifold and in communication with said hot air feed pipe, valves for controlling the communication of said feed pipes with the intake manifold and means for operating said valves.

In testimony whereof he affixes his signature.

GEORGE E. EWERS.